United States Patent Office 3,644,455
Patented Feb. 22, 1972

3,644,455
FERROUS HALIDE ADIPONITRILE COMPLEXES
Olav T. Onsager, Waldwick, N.J., assignor to
Halcon International, Inc.
No Drawing. Filed Dec. 11, 1969, Ser. No. 884,380
Int. Cl. C07c *121/26;* C07f *15/02*
U.S. Cl. 260—439 R           2 Claims

ABSTRACT OF THE DISCLOSURE

The present invention is directed to novel chemical complexes of ferrous bromide or ferrous chloride and adiponitrile. The complexes are useful, for example, as catalysts, as promoters, as a source of adiponitrile, as paint dryers and the like.

BACKGROUND OF THE INVENTION

The present invention is concerned with novel complexes of ferrous bromide or ferrous chloride and adiponitrile. In addition, the invention is concerned with methods of preparing these novel complexes.

The art is familiar with complexes of various metal halides such as ruthenium halide with materials such as nitriles. See for example U.S. Pat. 3,449,387. However, the present inventor is unaware of any pertinent prior art which pertains to the particular complexes which are the subject of the present invention.

RELATED APPLICATIONS

Patent applications which are generally related to the present case are U.S. Ser. No. 835,722 filed June 23, 1969 and Ser. No. 872,395 filed Oct. 29, 1969.

DETAILS OF THE INVENTION

The present invention is concerned with novel complexes having the formula $FeBr_2 \cdot NC(CH_2)_4CN$ and $FeCl_2 \cdot NC(CH_2)_4CN$. These materials are useful as catalysts for example in the decomposition of peroxides, as paint dryers, as promoters in the reductive coupling of halo-organic compounds including beta-halopropionitrile, as a source of adiponitrile and the like.

The novel and inventive complexes of this invention can be prepared in a number of different ways. For example, the complexes are conveniently prepared by reacting the ferrous halide with adiponitrile at temperatures ranging from about 0 to 300° C., preferably 20 to 200° C., and most desirably 80 to 170° C. It is usually desired to employ adiponitrile in excess of the stoichiometric amount although this is not an absolute requirement. The reaction is conducted at the above temperatures and under pressure sufficient to maintain the adiponitrile in the liquid phase. Inert solvents such as benzene, toluene, heptane, cyclohexane, acetone, dioxane, propionitrile, chlorobenzene and 3-bromopropionitrile can also be employed. In this preparation it is desirable to avoid the presence of water as this tends to interfere with the formation of the inventive complex and thus the preparation should be carried out under substantially anhydrous conditions.

As an alternative method of operation, the novel complexes are prepared as a result of the reductive coupling of beta-bromopropionitrile or beta-chloropropionitrile in the presence of metallic iron as reductive coupling reactant. In the liquid phase reductive coupling involving iron as coupling agent such as described for example in copending cases Ser. No. 835,722 filed June 23, 1969, and Ser. No. 872,395, filed Oct. 29, 1969, the liquid reaction product mixture contains substantial amounts of the complex which is the subject of this invention. In such procedures the complex itself can be recovered from the reaction mixture. The complex produced in this fashion is an important source of adiponitrile which can be recovered therefrom by appropriate procedures which include contact with water, elevated temperature distillation and the like.

The novel complexes are stable compounds having an elemental analysis corresponding respectively to

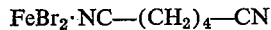

and

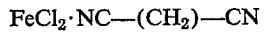

The ferrous bromide complex has a melting point of about 119° C. and is a red brown solid. The ferrous chloride complex has a melting point of about 170° C. and is a yellow brown solid.

The invention is illustrated by the following examples.

EXAMPLE 1

The $FeBr \cdot NC-(CH_2)_4-CN$ complex is prepared by preparing a reaction mixture consisting of 5 parts by weight anhydrous ferrous bromide, 20 parts by weight adiponitrile and 20 parts benzene. This mixture was heated under reflux (about 80° C.), until solution occurs (about one hour). The resulting solution is filtered hot and upon cooling to about room temperature the formation of crystals is observed. The crystals are separated by filtration, washed with benzene, dried in a stream of nitrogen at 20° C. and substantially stored in a vacuum desiccator. All stages of the preparation and recovery are carried out under a nitrogen atmosphere and all reagents are thoroughly dried prior to use. The yield of crystals is 3.2 parts by weight.

The crystals are red-brown in color and have a melting point of about 119° C. The infra red spectrum of the product showed a nitrile band of 2290 cm.$^{-1}$. Elemental analysis of the product corresponded substantially to the formula $FeBr_2 \cdot NC-(CH_2)_4-CN$.

EXAMPLE 2

The $FeCl_2 \cdot NC(CH_2)_4-CN$ complex is prepared by preparing a reaction mixture consisting of 15 grams anhydrous ferrous chloride and 50 cc. of adiponitrile. This mixture is heated with stirring at 170° C. for 0.5 hour. The resulting solution is filtered hot (at 160° C.), cooled to about room temperature and then poured into 250 cc. of ether. The complex is separated from the mixture as a brown oil which upon further washing with fresh ether turned into a yellow brown crystalline solid. The complex is isolated by filtration and dried in vacuum at room temperature. All stages of the preparation and recovery are carried out under a nitrogen atmosphere and all reagents are thoroughly dried prior to use. The yield of crystals is 25.5 grams. The complex is yellow brown in color and has a melting point of about 170° C. The infra red spectrum of the product in KBr showed a strong nitrile band at 2293 cm.$^{-1}$. Elemental analysis of the product correspond substantially to the formula

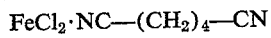

EXAMPLE 3

In order to demonstrate the utility of the complex which is the subject of the present invention, an experiment was performed whereby beta-bromopropionitrile was reductively coupled in the presence of a coupling agent comprising metallic iron and the present inventive complexes (Runs A and B). The details of this reductive coupling and of a similar reductive coupling but which did not employ the said inventive complex (Run C) are as follows:

The Reactions A and B are carried out in a 1000 cc. stirred glass reactor.

In Run A is charged:

| | G. |
|---|---|
| 3-bromopropionitrile | 292 |
| Acrylonitrile | 8 |
| Fe powder | 20 |
| $FeBr_2 \cdot NC-(CH_2)_4-Cn$ complex | 20 |

In Run B is charged:

| | G. |
|---|---|
| 3-bromopropionitrile | 292 |
| Acrylonitrile | 8 |
| Fe powder | 20 |
| $FeCl_2 \cdot NC-(CH_2)_4-CN$ | 20 |

In Run C is charged:

| | G. |
|---|---|
| 3-bromopropionitrile | 292 |
| Acrylonitrile | 8 |
| Fe powder | 20 |

Each reaction mixture is heated with agitation for 2 hours at 150° C. Then cooled to room temperature and analyzed for the amount of adiponitrile formed and converted reducing agent. The results are summarized in Table I and clearly demonstrate the effect of the present inventive complex as a promoting salt in the reductive coupling of 3-bromopropionitrile with metallic iron as the reducing agent.

TABLE I

| | Run A | Run B | Run C |
|---|---|---|---|
| Coupling metal conversion, percent | 100 | 50 | 10 |
| Selectivity to adiponitrile based on converted metal, mol percent | 55 | 28 | 20 |

I claim:
1. A complex having the formula

$$FeBr_2 \cdot NC-(CH_2)_4-CN$$

2. A complex having the formula $$FeCl_2 \cdot NC-(CH_2)_4-CN$$

References Cited
UNITED STATES PATENTS 3,349,387    6/1969    Chabardes et al. _____ 260—429

OTHER REFERENCES

Latimer, Anal. Chem. 35 (1963), p. 1983,

TOBIAS E. LEVOW, Primary Examiner

A. P. DEMERS, Assistant Examiner

U.S. Cl. X.R.

106—310; 252—431 N; 260—465.8 R